United States Patent [19]

Shelton

[11] Patent Number: 5,309,812

[45] Date of Patent: May 10, 1994

[54] METHOD AND DEVICE TO AID IN LEARNING TO PLAY CHORDS ON A HARMONICA

[76] Inventor: Edward M. Shelton, P.O. Box 8659, Atlanta, Ga. 30306

[21] Appl. No.: 881,224

[22] Filed: May 11, 1992

[51] Int. Cl.$^5$ .............................................. G10G 1/00
[52] U.S. Cl. .................................... 84/471 R; 84/483.2
[58] Field of Search ................. 84/470 R, 471 R, 472, 84/483.2

[56] References Cited

U.S. PATENT DOCUMENTS

| | | | |
|---|---|---|---|
| 2,487,021 | 11/1949 | Green . | |
| 2,655,830 | 10/1953 | Balint | 84/377 |
| 2,915,849 | 12/1959 | Johnston . | |
| 3,978,756 | 9/1976 | Feldman | 84/470 R |
| 4,402,249 | 9/1983 | Zankman | 84/453 |

Primary Examiner—William M. Shoop, Jr.
Assistant Examiner—Jeffrey W. Donels
Attorney, Agent, or Firm—Michael Drew

[57] ABSTRACT

An elongated flexible sheet (20) contains numbers (22, 26) and corresponding parallel lines (24) that are aligned with the holes (13) of a harmonica (11). The top portion of the sheet (20) contains rows (30, 37, 40, 47) of respective color-coded blocks (32, 34, 36, 38, 39, 52, 54, 56, 48, 49) superimposed over the parallel lines (24). The color-coded blocks (32, 34, 36, 38, 39, 52, 54, 56, 48, 49) encompass sets of lines (24) that correspond to chords which may be played on the harmonica (11). The colors are chosen to create a mnemonic reference. The sheet (20) attaches to a harmonica (11) and is flexed into a viewing position for ready reference upon grasping the harmonica (11).

12 Claims, 2 Drawing Sheets

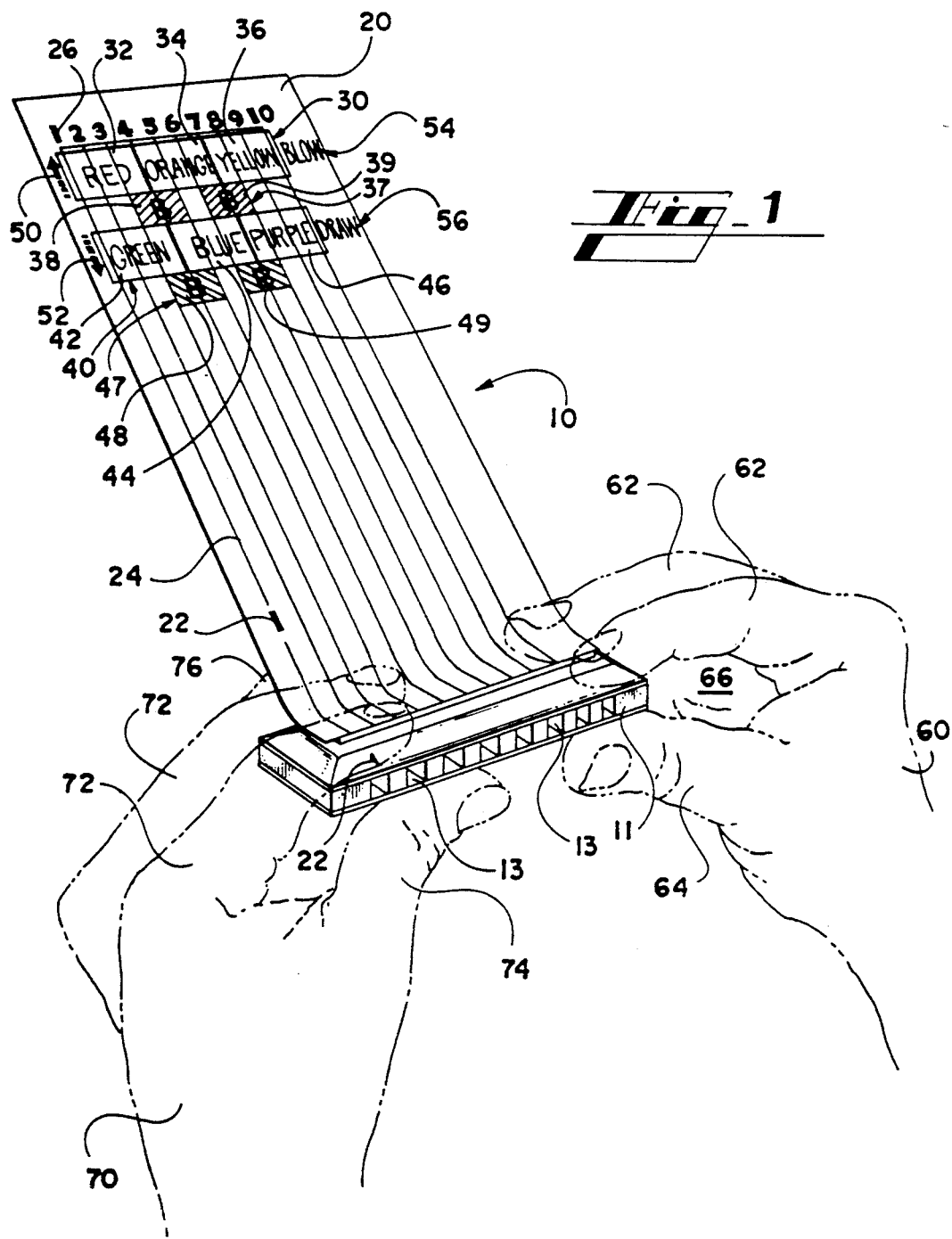

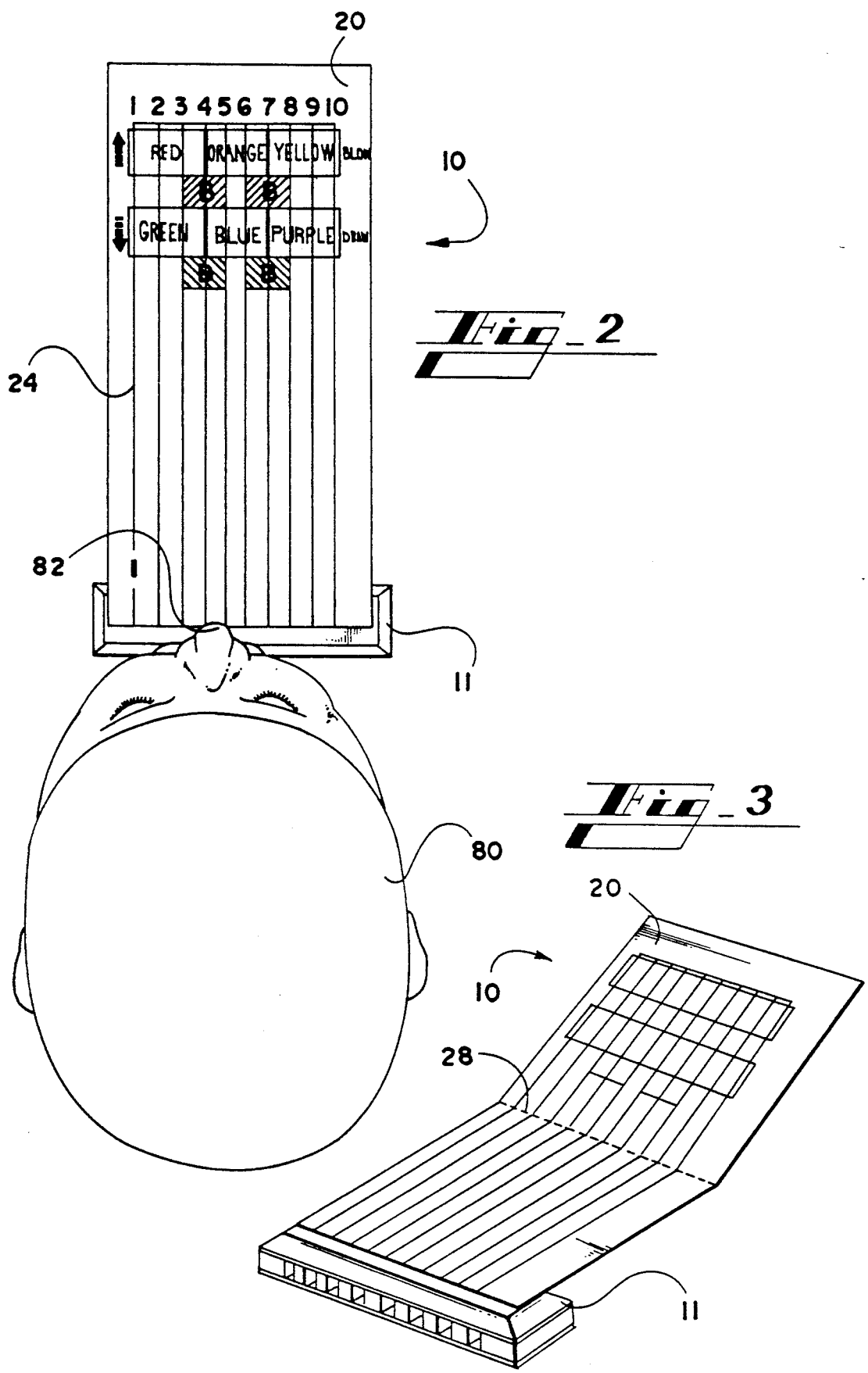

METHOD AND DEVICE TO AID IN LEARNING TO PLAY CHORDS ON A HARMONICA

TECHNICAL FIELD OF THE INVENTION

The present invention relates to devices for facilitating the playing of a musical instrument, and more particularly to a device and method for facilitating playing of a harmonica.

BACKGROUND OF THE INVENTION

The harmonica is a musical instrument that is played by blowing or drawing air through a horizontal row of holes in the instrument. Air may be blown or drawn through the holes either singly or through several adjacent holes simultaneously. One of the difficulties in attempting to play a harmonica is becoming familiar enough with the location of the holes in the harmonica so that music can be played coherently and accurately without removing the harmonica from a playing position upon or near a player's mouth. Individuals attempting to play a harmonica are often frustrated by the difficulty in learning to play a recognizable tune. Thus, it would be advantageous to have an aid that makes playing a harmonica less difficult.

SUMMARY OF THE INVENTION

It is an object of the invention to provide a device that makes playing a harmonica easier.

It is a further object of the invention to provide a method that makes playing a harmonica easier.

In the present invention, an elongated flexible sheet contains numbers and corresponding parallel lines that are aligned with the holes of a harmonica. The top portion of the sheet contains rows of color-coded blocks superimposed over the parallel lines. The color-coded blocks encompass sets of lines that correspond to chords which may be played on the harmonica. The colors are chosen to create a mnemonic reference. The sheet attaches to a harmonica and is flexed into a viewing position for ready reference upon grasping the harmonica. Songs are written in a color-coded chordal format corresponding to the color coding of the sheet. The color-coded chords are communicated to a player by visual or verbal means. The song is then able to be played in a chordal mode.

Other aspects, objects, features, and advantages of the present invention will become apparent to those skilled in the art upon reading the detailed description of preferred embodiments.

BRIEF DESCRIPTION OF THE DRAWINGS

FIG. 1 is an isometric illustration of a device for facilitating playing of a harmonica according to the present invention.

FIG. 2 is a top plan view of the invention of FIG. 1 with the head of an individual whose nose is pointing at a position.

FIG. 3 is an isometric illustration of an alternate embodiment of the invention of FIG. 1.

DETAILED DESCRIPTION OF PREFERRED EMBODIMENTS OF THE INVENTION

While the specification concludes with claims particularly pointing out and distinctly claiming the subject matter which is regarded as the present invention, the invention will now be described with reference to the following description of embodiments taken in conjunction with the accompanying drawings.

The device and method of the invention enable a harmonica player to rapidly determine his or her position on the harmonica and quickly align his or her mouth over the desired holes to play a tune. Referring to FIG. 1, therein is illustrated a device 10 for facilitating playing of a harmonica in accordance with a preferred embodiment of the invention. The device 10 is shown attached to a harmonica 11 as grasped by a player. The device 10 is an elongated sheet of flexible material 20 containing coded indicia and attaches to the top of a harmonica 11. The bottom edge of the sheet 20 is aligned with the leading edge of a harmonica 11 which has holes 13 through which air is blown or drawn. The harmonica shown has ten holes and is representative of a standard 10-hole diatonic harmonica. Numerals 22 from one through ten may be displayed along the bottom edge of the sheet 20 and spaced to be aligned with the holes 13 of the harmonica 11 when the device 10 is attached to the harmonica 11. However, the preferred embodiment 10 illustrates a more simple sheet 20 having only one numeral 22, namely the number "1," for alignment with the number 1 hole of the harmonica. Parallel lines 24 are aligned with the holes 13 of the harmonica 11 and extend from the bottom edge of the sheet 20 to the top portion of the sheet 20. For clarity and ease of alignment the number "1" is interposed between the first line of the set of lines 24. Numerals one through ten 26 are identically spaced with the lines 24.

Color-coded boxes extend across and encompass several lines 24. The holes 13 which are encompassed by the boxes equate to chords that will be played when air is passed through the holes 13 denoted. In music, a chord is a combination of notes played simultaneously. As a convenient reference in the invention, chords that are played on a harmonica 11 are designated "primary" chords and "secondary" chords. This system is used to distinguish a group of notes which may be played when a player's mouth is aligned in a certain position on the harmonica 11. In the preferred embodiment illustrated, the first row 30 of boxes delineates chords which are played by blowing which have the root note of the chord followed by succeeding intervals. The third row of boxes 40 delineates chords that are formed when air is drawn through the holes 13 designated in the first row 30. The second row of boxes 37 designates holes 13 which when blown through create selected chords other than those designated in the first row 37. These are the so-called secondary chords of the invention. Also in the preferred embodiment, the fourth row of boxes 47 shown delineates chords that are formed when air is drawn through the holes 13 designated in the second row 37. Color coding is used to identify the boxes in each row so that the playing position of the mouth on the harmonica which must be achieved to play a chord is readily recognizable. A different color denotes each box and group of holes to be played simultaneously. In general, the colors chosen are the readily recognizable rainbow colors. Although many combinations of colors may be used with the invention, in the preferred embodiment of the device 10, so-called warm and cool colors are colors are used for coding to create a mnemonic reference that further enhances the ease of playing a harmonica using the invention. The warm colors are used for chords that result from blowing into the harmonica while cool colors are used for chords that result from drawing air into the mouth through the harmonica. The mnemonic connection between the colors and the generation of air is that an individual is capable of blowing warm air from his or her mouth while air drawn into the mouth generally creates a cool sensation. The warm colors red, orange and yellow are used to respectively identify three boxes 32, 34, 36 that encompass lines 24 aligned with holes 13 which may be blown through to create primary chords. A second row of boxes 37 denote secondary chords in the "blow" mode. Warm colors red and orange are again used to identify two boxes respectively 38, 39 that encompass lines 24 aligned with holes 13 which may be blown through to create the secondary chords. Oblique lines of the selected colors are used to maintain the mnemonic association between warm colors and blowing but differentiate primary-chord solid-colored blocks from secondary-chord lined-colored blocks. The letter "B" is superimposed over the secondary-chord blocks 38, 39 to create another mnemonic reference, namely, to the notion of secondary chords being associated with a B level of an item. Generally, the first or primary level of anything is thought of as the "A" level, such as the "A" team in competitive events, while the "B" level of anything is considered to be secondary, such as a B-level or B-grade movie as considered to be secondary or the B-team as considered to be secondary to the A-team. The cool colors green, blue and purple are used to respectively identify three boxes 42, 44, 46 that encompass lines 24 aligned with holes 13 which may be drawn through to create primary chords. A fourth row of boxes 47 denote secondary chords in the "draw" mode. Cool colors green and blue are again used to identify two boxes respectively 48, 49 that encompass lines 24 aligned with holes 13 which may be drawn through to create the secondary chords. Oblique lines of the selected cool colors are used to maintain the mnemonic association between cool colors and drawing air but differentiate primary-chord solid-colored blocks from secondary-chord lined-colored blocks. The oblique lines of the secondary-chord boxes 38, 39 in the blow mode are slanted in an opposite direction from the secondary-chord boxes 48, 49 in the draw mode so as to further allow the two sets of boxes 37, 47 to be distinguished. Again, the letter "B" is superimposed over the secondary-chord boxes 48, 49.

To further facilitate quick recognition of the proper notes to play (that is, holes to blow or draw air through), markings indicating that holes 13 signified by the boxes that are to be blown through or drawn through are placed next to each row of boxes 30, 37, 40, 47. An upward arrow 50 indicates that air is to be blown through the holes 13 and a downward arrow 52 indicates that air is to be drawn through the holes 13. The words "BLOW" 54 and "DRAW" 56 may also be used in addition to or in lieu of the arrows 50, 52 as a more direct marking.

The device 10 may also be made with a different number and spacing of numerals 22, 24 and lines 26 that correspond to harmonicas having a different number and spacing of holes such as a chromatic or tremolo harmonica or harmonicas that have more than ten holes. The device may also be made without the bottom numeral or numerals 22 in instances where the device 10 will be attached to a harmonica which has numerals inscribed over the holes.

Operation and use of the device is simple. The sheet 20 is attached to the top surface of the harmonica 11 by any suitable means. For example, a hook and loop fastener may be used. In this manner, the sheet 20 may be detached from the harmonica 11 for placement of the harmonica in a case and ready attached when the harmonica 11 will again be used.

After the sheet 20 is attached with the bottom numerals 22 aligned with the holes 13 of the harmonica, the harmonica 11 is grasped in one or both hands 60, 70 of an individual in a standard playing position. A suitable manner of grasping the harmonica 11 with the sheet 20 attached is to hold the harmonica 11 between the forefingers 62, 72 and thumb 64, 74 of each hand while placing the rear fingers 66, 76 of each hand under the sheet 20 and flexing the sheet upwardly so that the top portion of the sheet is visible while the harmonica is held in a comfortable playing position. The height of the top portion of the sheet 20 above the harmonica 11 may be easily adjusted by an individual by simply placing more or less flex upon the sheet. When the harmonica 11 and sheet 20 are held in this manner the nose of the player becomes a pointer which may be aligned with the one of the lines 24. Referring now also to FIG. 2, therein is illustrated the head 80 of an individual playing a harmonica 11 with the device 10 attached. The nose 82 of the individual generally points along the line or lines 24 corresponding to a hole or holes 13 in the harmonica 11 which are at the center of the mouth of the individual. After a few practice blows, a player is quickly able to determine which and how many of the holes 13 are covered by his or her mouth when the player's nose is pointed along a particular line or lines 24 or space between particular lines 24. The player now has a ready visual reference which enables him or her to become quickly acclimated with the harmonica 11. The sheet 20 may be transparent. A transparent sheet 20 allows a player to see a musical conductor, other musicians or sheet music through the sheet while holding the harmonica 10 in a playing position. Referring now also briefly to FIG. 3, the device 10 is shown scored so that in addition to or instead of flexing of the sheet 20 the top portion of the sheet 20 may be bent upward along the score 28. The top portion of the sheet 20 is visible to a player upon bending.

The numeral or numerals 22 on the bottom edge of the sheet 20 provide an easy means for alignment of the device 10 with proper holes 13 of the harmonica. The numerals 22 also serve as a ready reference for identifying the holes 13. Since it is difficult for an individual to clearly see lettering or numbers at a distance as close as the top surface of a harmonica 11 when the harmonica is held in a playing position, the lines 24 and top numerals 26 make the individual aware of the position of his or her mouth on the harmonica 11 without the removing the mouth from the harmonica 11.

The following is an example of a song written in the color-coded format of the invention. In the example, the words of a song of known melody appear over colors corresponding to colors contained on the device. As previously discussed, the colors from the color-coded sheet of music or color-coded instructions which are called out are directions to the individual playing the harmonica 11 based upon the described mnemonic reference system of the invention. The song is as follows:

| | | | | | | |
|---|---|---|---|---|---|---|
| MA- | RY | HAD | A | LIT- | TLE | LAMB, |
| RED | GREEN | RED | GREEN | B-RED | B-RED | B-RED |
| LIT- | TLE | LAMB, | LIT- | TLE | LAMB. | |
| GREEN | GREEN | GREEN | B-RED | ORANGE | ORANGE | |
| MA- | RY | HAD | A | LIT- | TLE | LAMB, |
| RED | GREEN | RED | GREEN | B-RED | B-RED | B-RED |
| FLEECE | AS | WHITE | AS | SNOW. | | |
| GREEN | GREEN | B-RED | GREEN | RED | | |

A player will either read the color-coded sheet music or have the colors called out to him or her in time as the song is played. The device 10 is held in position as described above for ready reference as the individual plays the song.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. A device to aid in learning to play cords on a harmonica comprising:
   an elongated flexible sheet having a top edge and a bottom edge;
   means for attaching said bottom edge of said elongated flexible sheet to a top surface of the harmonica adjacent holes of the harmonica through which air is passed for playing;
   a first display of numerals proximate said bottom edge of said elongated flexible sheet corresponding to and spaced in relation to the holes of the harmonica so such that said numerals are aligned adjacent the respective holes of the harmonica when said flexible sheet is attached to the harmonica;
   a second display of numerals identical to and in vertical alignment with said first display of numerals proximate said top edge of said elongated flexible sheet;
   a plurality of lines displayed on said elongated flexible sheet respectively corresponding in number to said first and second display of numerals, each said line extending along a length of said elongated sheet between corresponding identical numerals of said first display of numerals and said second display of numerals;
   a first row of blocks displayed on said elongated flexible sheet adjacent said second display of numerals, each said block extending transversely to encompass a series of said lines which correspond to holes of the harmonica which form a chord, each said block having indicia denoting a color and each color being different;
   first breath indicia denoting whether a player is to blow or draw air displayed on said elongated flexible sheet adjacent said first row of blocks;
   a second row of blocks displayed on said elongated flexible sheet adjacent said first row of blocks, each said block extending transversely to encompass a series of said lines which correspond to holes of the harmonica which form a chord, each said block having indicia denoting a color of one of said blocks of said first row of blocks and displaying the letter "B;"
   a third row of blocks displayed on said elongated flexible sheet adjacent said second row of blocks, each said block extending transversely to encompass a series of said lines which correspond to holes of the harmonica which form a chord, each said block having indicia denoting a color and each color being different than colors denoted in said first row of blocks;
   second breath indicia denoting whether a player is to blow or draw air displayed on said elongated flexible sheet adjacent said third row of blocks; and
   a fourth row of blocks displayed on said elongated flexible sheet adjacent said third row of blocks, each said block extending transversely to encompass a series of said lines which correspond to holes of the harmonica which form a chord, each said block having indicia denoting a color of one of said blocks of said third row of blocks and displaying the letter "B."

2. The invention of claim 1, said means for attaching said bottom edge of said elongated flexible sheet to a top surface of the harmonica comprising a hook-and-loop fastener.

3. The invention of claim 1, said indicia denoting a color comprising said block being marked with a color.

4. The invention of claim 1, said indicia denoting a color of a block of said first and third rows of blocks comprising a color substantially covering the block and said indicia denoting a color of a block of said second and fourth rows of blocks comprising oblique lines of the color.

5. The invention of claim 1, said color denoted for said first row of blocks comprising a color selected from the group of colors red, orange and yellow.

6. The invention of claim 1, said color denoted for said third row of blocks comprising a color selected from the group of colors green, blue and purple.

7. The invention of claim 1, wherein
   the harmonica is a ten-hole diatonic harmonica and
   said first row of blocks comprises a first block encompassing lines one through four, a second block encompassing lines four through seven and a third block encompassing lines seven through ten,
   second row of blocks comprises a fourth block encompassing lines three through five and a fifth block encompassing lines six through eight,
   said third row of blocks comprises a sixth block encompassing lines one through four, a seventh block encompassing lines four through seven and an eighth block encompassing lines seven through ten,
   said fourth row of blocks comprises a ninth block encompassing lines three through five and a tenth block encompassing lines six through eight.

8. The invention of claim 1, wherein the chords formed by said blocks of said first and third rows of blocks comprise primary musical harmonica chords and the chords formed by said blocks of said second and fourth rows of blocks comprise secondary musical harmonica chords.

9. A method for playing a song in a chord format on a harmonica comprising a device having
- an elongated flexible sheet having a top edge and a bottom edge;
- means for attaching said bottom edge of said elongated flexible sheet to a top surface of the harmonica adjacent holes of the harmonica through which air is passed for playing;
- a first display of numerals proximate said bottom edge of said elongated flexible sheet corresponding to and spaced in relation to the holes of the harmonica so such that said numerals are aligned adjacent the respective holes of the harmonica when said flexible sheet is attached to the harmonica;
- a second display of numerals identical to and in vertical alignment with said first display of numerals proximate said top edge of said elongated flexible sheet;
- a plurality of lines displayed on said elongated flexible sheet respectively corresponding in number to said first and second display of numerals, each said line extending along a length of said elongated sheet between corresponding identical numerals of said first display of numerals and said second display of numerals;
- a first row of blocks displayed on said elongated flexible sheet adjacent said second display of numerals, each said block extending transversely to encompass a series of said lines which correspond to holes of the harmonica which form a chord, each said block having indicia denoting a color and each color being different;
- first breath indicia denoting whether a player is to blow or draw air displayed on said elongated flexible sheet adjacent said first row of blocks;
- a second row of blocks displayed on said elongated flexible sheet adjacent said first row of blocks, each said block extending transversely to encompass a series of said lines which correspond to holes of the harmonica which form a chord, each said block having indicia denoting a color of one of said blocks of said first row of blocks and displaying the letter "B;"
- a third row of blocks displayed on said elongated flexible sheet adjacent said second row of blocks, each said block extending transversely to encompass a series of said lines which correspond to holes of the harmonica which form a chord, each said block having indicia denoting a color and each color being different than colors denoted in said first row of blocks;
- second breath indicia denoting whether a player to blow or draw air displayed on said elongated flexible sheet adjacent said third row of blocks; and
- a fourth row of blocks displayed on said elongated flexible sheet adjacent said third row of blocks, each said block extending transversely to encompass a series of said lines which correspond to holes of the harmonica which form a chord, each said block having indicia denoting a color of one of said blocks of said third row of blocks and displaying the letter "B;" the method comprising
  - (a) attaching said bottom edge of said elongated flexible sheet to the top surface of the harmonica and upwardly flexing a top unattached end of said elongated flexible sheet so that it is perceivable by a player;
  - (b) converting each note of a musical line of a song into a chord to be played on the harmonica and designating one of said colors to represent each said chord; and
  - (c) communicating the sequence of colors representing said musical line so that the player may play the musical line corresponding to the sequence of colors.

10. The invention of claim 9, wherein the step of communicating the sequence of colors representing said musical line comprises communicating a visual display of the sequence of colors.

11. The invention of claim 10, wherein said visual display of the sequences of colors comprises a music sheet which displays the sequence of colors.

12. The invention of claim 9, wherein the step of communicating the sequence of colors representing said musical line comprises communicating an aurally perceivable recitation of the sequence of colors.

* * * * *